United States Patent
Rudnev et al.

(10) Patent No.: US 10,034,331 B2
(45) Date of Patent: Jul. 24, 2018

(54) CONTROLLED ELECTRIC INDUCTION HEATING OF AN ELECTRICALLY CONDUCTIVE WORKPIECE IN A SOLENOIDAL COIL WITH FLUX COMPENSATORS

(75) Inventors: Valery I. Rudnev, Rochester Hills, MI (US); Don L. Loveless, Sterling Heights, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 1307 days.

(21) Appl. No.: 12/344,423

(22) Filed: Dec. 26, 2008

(65) Prior Publication Data

US 2009/0166353 A1 Jul. 2, 2009

Related U.S. Application Data

(60) Provisional application No. 61/017,111, filed on Dec. 27, 2007.

(51) Int. Cl.
 *H05B 6/04* (2006.01)
 *H05B 6/36* (2006.01)
 *H05B 6/14* (2006.01)

(52) U.S. Cl.
 CPC ............... *H05B 6/365* (2013.01); *H05B 6/14* (2013.01)

(58) Field of Classification Search
 CPC . H05B 6/14; H05B 6/365; H05B 6/36; H05B 6/362; H05B 6/40; H05B 6/367
 USPC .......... 219/660, 672, 673, 674–677
 See application file for complete search history.

(56) References Cited

U.S. PATENT DOCUMENTS

| | | | |
|---|---|---|---|
| 2,299,934 A * | 10/1942 | Sherman et al. | 219/640 |
| 5,306,365 A | 4/1994 | Reighard | |
| 5,448,039 A | 9/1995 | Okayama et al. | |
| 5,510,600 A * | 4/1996 | Jackson | 219/645 |
| 5,550,353 A | 8/1996 | Peysakhovich et al. | |
| 5,554,836 A | 9/1996 | Stanescu et al. | |
| 5,821,504 A | 10/1998 | Sprenger et al. | |
| 5,837,976 A * | 11/1998 | Loveless et al. | 219/645 |
| 5,844,213 A | 12/1998 | Peysakhovich et al. | |
| 6,091,063 A * | 7/2000 | Woods | 219/645 |
| 6,437,301 B1 | 8/2002 | Kitano et al. | |
| 6,555,801 B1 | 4/2003 | LeMieux et al. | |
| 6,576,877 B2 | 6/2003 | Dabelstein et al. | |
| 6,635,856 B2 | 10/2003 | Fishman | |
| 6,730,893 B1 | 5/2004 | Runde | |
| 6,781,100 B2 | 8/2004 | Pilavdzic et al. | |

(Continued)

FOREIGN PATENT DOCUMENTS

GB 2262420 A 6/1993

OTHER PUBLICATIONS

G.W.C. Kaye & T.H. Laby, Table of Physical and Chemical Constants, 14th ed, Longman (Wikipedia); 1973.*

(Continued)

*Primary Examiner* — Tu B Hoang
*Assistant Examiner* — Diallo I Duniver
(74) *Attorney, Agent, or Firm* — Philip O. Post

(57) ABSTRACT

Apparatus and method are provided for inductively heating workpieces with varying characteristics in the same induction coil while selectively controlling the induced heat temperature distribution profile of each workpiece with one or more flux compensators inserted into the induction coil along with the workpiece to be inductively heated.

12 Claims, 12 Drawing Sheets

(56) References Cited

U.S. PATENT DOCUMENTS

| | | |
|---|---|---|
| 6,815,649 B2 | 11/2004 | Beer |
| 7,034,263 B2 | 4/2006 | Kagan |
| 7,041,944 B2 | 5/2006 | Pilavdzic et al. |
| 7,214,912 B1 | 5/2007 | Suszezynski |
| 2007/0235446 A1* | 10/2007 | Cao et al. .................... 219/645 |
| 2007/0246459 A1 | 10/2007 | Loveless et al. |
| 2008/0296290 A1 | 12/2008 | Cao et al. |

OTHER PUBLICATIONS

Journal of Magnetism and Magnetic Materials 214—Microstructure, frequency and temperature-dependent dielectric properties of cobalt-substituted lithium ferrites (Wikipedia); Feb. 2, 2000.*

Chester A. Tudbury, Basics of Induction Heating, May 1960, pp. 1-50, 1-51 and 1-52, vol. 1, Rider, New York (5 pages total).

M.G. Lozinskii, Industrial Applications of Induction Heating, 1969, pp. 598-599, Pergamon Press Ltd., London (3 pages total).

S.L. Semiatin and D.E Stutz, Induction Heat Treatment of Steel, 1986, pp. 75-77, American Society for Metals, Metals, Park, OH (5 pages total).

Maurice Orfueil, Electric Process Heating, 1987, pp. 416-417, 420-423, Battelle Press, Columbus, Ohio USA (5 pages total).

S. Zinn and S.L. Semiatin, Elements of Induction Heating: Design, Control and Applications, 1988, pp. 193, 194, 198-200, 241-246, ASM International, Metals Park, OH (13 pages total).

E.J. Davies, Conduction and Induction Heating, 1990, pp. 246, 247 and 281, Peter Peregrinus Ltd., London UK (4 pages total).

Valery Rudnev, Don Loveless, Raymond Cook and Micah Black, Handbook of Induction Heating, 2003, pp. 499-509, Marcel Dekker, Inc., New York NY (13 pages total).

Advanced Induction Heating for Improved Stress Relief on API Pipes, GH Group—Spain, Tube and Pipe Technology, Nov./Dec. 2006, p. 76, USA (1 page total).

V. Rudnev, An Objective Assessment of Magnetic Flux Concentrators, Heat Treating Process, ASM International, Nov. 2004, pp. 19-23, Ohio (5 pages total).

V. Rudnev, and R. Cook, Understanding Induction Bar End Heating, Reprinted from Forging, Winter 1995, (4 pages), Penton Publishing Inc., USA (4 pages total).

V. Rudnev and R. Cook, Magnetic Flux Concentrators: Myths, Realities and Profits, Metal Heat Treating, Mar./Apr. 1995, pp. 31-34, Penton Publishing Inc., USA (4 pages total).

* cited by examiner

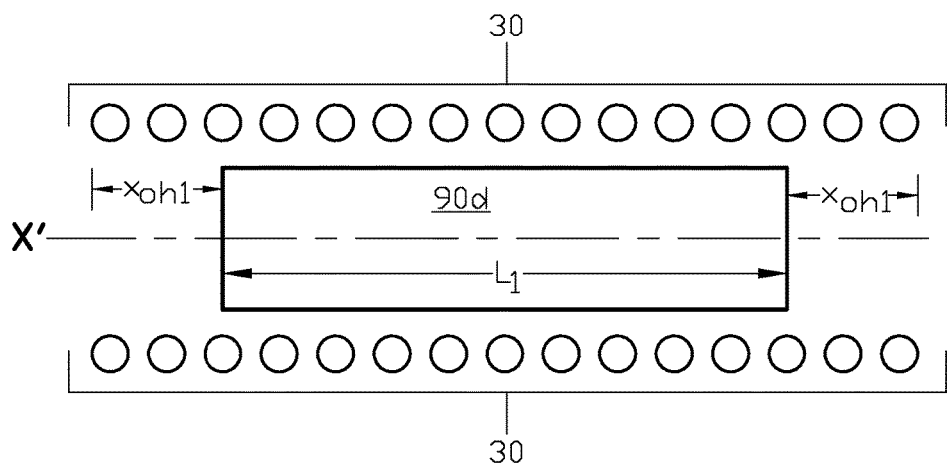
FIG. 5(a)
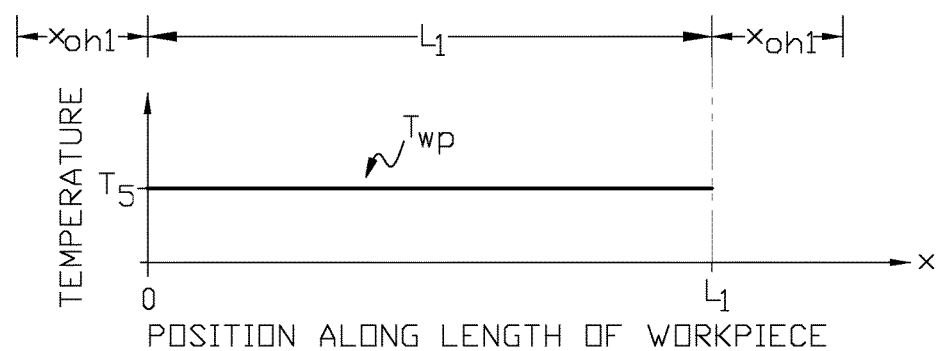
FIG. 5((b)

POSITION ALONG LENGTH OF WORKPIECE
AND FLUX COMPENSATOR

CONTROLLED ELECTRIC INDUCTION HEATING OF AN ELECTRICALLY CONDUCTIVE WORKPIECE IN A SOLENOIDAL COIL WITH FLUX COMPENSATORS

CROSS REFERENCE TO RELATED APPLICATIONS

This application claims the benefit of U.S. Provisional Patent Application Ser. No. 61/017,111 filed Dec. 27, 2007, hereby incorporated herein by reference in its entirety.

FIELD OF THE INVENTION

The present invention relates to electric induction heating of an electrically conductive workpiece positioned within a solenoidal induction coil.

BACKGROUND OF THE INVENTION

Electric induction heating can be used to heat electrically conductive materials. Induction heating may be used, for example, prior to forging, extrusion, rolling and other metal hot and warm forming operations. In other applications induction heating of electrically conductive workpieces can be used for heat treatment processes such as hardening, annealing, normalizing, stress relieving and tempering. Some applications require uniform heating of the entire workpiece, while other applications require heating of specific regions of the workpiece, or require heating to gradient temperatures through the workpiece such as an aluminum billet prior to an extrusion process.

As illustrated in FIG. 1(a) workpiece 90, which may be cylindrical in shape, is held in place within solenoidal induction coil 30. Support structure for holding the workpiece within the coil is not shown in FIG. 1(a). When suitable ac power is supplied to the coil, the electrically conductive workpiece is inductively heated by magnetic coupling with the generally longitudinal flux field established by the flow of ac current through the coil. When uniform heating along the length of the workpiece is desired, the workpiece is positioned in the coil so that the opposing ends of the coil overhang the opposing ends of the workpiece in the coil. The longitudinal central axis (designated X' in FIG. 1(a)) of the coil and workpiece may be coincident as shown in the figure, and the coil is generally shaped to coincide with the longitudinal surfaces of the workpiece, or to achieve varying degrees of induced heating along the length of the workpiece. The coil overhang distance, $x_{oh}$, at each end of the coil controls the shape of the flux field established in the interior overhang regions of the coil so that the flux field intensity established within the opposing ends of the workpiece provides for uniform heating along the length of the workpiece, including the opposing ends of the workpiece, as required in this example. For example a uniform longitudinal temperature $T_1$ (graphically illustrated in FIG. 1(b)) may be achieved along the entire length $L_1$ of the workpiece in the isothermal cross section region $R_{iso}$ defined between adjacent idealized isothermal dashed lines in FIG. 1(c). The overhang distance required to achieve this workpiece heating profile is affected by a number of parameters, including the outside diameter (OD) of the workpiece; the overall length of the workpiece; the workpiece's physical and metallurgical properties; coil geometry and the frequency of the ac power applied to the coil. The term "workpiece characteristics" is used to collectively describe the physical dimensions and metallurgical properties of the workpiece. Therefore different coils, each with unique characteristics, and possibly also different power supplies, are ideally used to uniformly heat workpieces of different sizes or different physical properties. However changing coils in an industrial environment to accommodate workpieces with different characteristics is time and cost ineffective. Therefore accommodations are often made to heat various sizes of workpieces in the same induction coil connected to one ac power source with varying degrees of success.

Variation in the length of a workpiece heated in a single induction coil directly impacts the coil overhang distances at each end of the coil and, consequently, the temperature distribution along the overall length of the inductively heated workpiece. For example when inductively heating a cylindrical workpiece with a relatively short overall length in an induction coil designed for uniform longitudinal heating of cylindrical workpieces with longer overall lengths, the end regions of the shorter workpiece that are exposed to greater coil overhang regions than the overhang regions for the longer workpieces will have excessive heat sources and, consequently, will be overheated relative to the central region of the shorter workpiece. For example FIG. 2(a), FIG. 2(b) and FIG. 2(c) each illustrate the same induction coil 30 used to inductively heat three workpieces having different dimensions. Workpiece 90a in FIG. 2(a) has an OD equal to $OD_1$ and an overall length equal to $L_1$; workpiece 90b in FIG. 2(b) has an OD equal to $OD_1$ and a length equal to $L_2$, which is less than length $L_1$; workpiece 90c in FIG. 2(c) has an OD equal to $OD_2$, which is less than outside diameter $OD_1$ and an overall length equal to $L_1$. As illustrated by the heated workpiece temperature distribution profiles in FIG. 2(a)', FIG. 2(b)' and FIG. 2(c)', respectively for the arrangements in FIG. 2(a), FIG. 2(b) and FIG. 2(c), the coil overhang distance $X_{oh1}$ provides the desired uniform temperature distribution along the overall length of the workpiece of the particular geometry shown in FIG. 2(a), but the same coil fails to provide temperature uniformity along the length of the workpieces of different geometries in FIG. 2(b) and FIG. 2(c). Positioning the shorter workpiece in the coil non-symmetrically (FIG. 2(b)) so that the coil overhang distance at one end would be the optimal $(X_{oh1})$ would then provide the desired temperature uniformity at that end of the workpiece at the expense of intensifying overheating at the opposing end of the workpiece. Heating a workpiece with an OD less than the OD of a workpiece for which the induction coil was designed to uniformly heat results in underheating of the ends of the smaller OD workpiece due to the reduction of heat sources from the electromagnetic end effect as shown in FIG. 2(c)' for the arrangement in FIG. 2(c).

If two workpieces have the same shape but are fabricated from materials with different physical or metallurgical properties, for example metal alloys with different electrical resistivities (ρ), using an induction coil and power supply designed to inductively heat the first of the two workpieces with an electrical resistivity of $\rho_1$ to a uniform longitudinal temperature distribution profile will result in overheating of the ends of the second workpiece that has an electrical resistivity $\rho_2$, which is less than $\rho_1$, due to the electromagnetic end effect. Conversely if the second workpiece has an electrical resistivity, $\rho_3$, which is greater than $\rho_1$, underheating of the ends of the second workpiece will result.

An alternative approach to a single solenoidal coil with power supply connections at opposing ends of the coil is a coil with multiple power supply tap connections 80 along the length at one end of the coil as diagrammatically illustrated in FIG. 3(a) and FIG. 3(b). By selecting a power supply end tap 80 based upon the characteristics of the workpiece to be heated in the coil, the energized length of the coil, and therefore the overhang distances, can be changed to provide uniform heating of workpieces with different characteristics, such as workpiece 90a' (utilizing end tap 80b) in FIG. 3(b), which is shorter in overall length than workpiece 90a (utilizing end tap 80a) in FIG. 3(a). There are several drawbacks to this multiple tap configuration. For example workpiece heating production time is lost when the taps are manually changed. These and other factors make a multiple tap coil arrangement disadvantageous for inductively heating a large variety of workpieces with different characteristics.

One object of the present invention is to selectively control the induced heating temperature distribution profile of electrically conductive workpieces with different characteristics in the same induction coil or combination of induction coils.

Another object of the present invention is to achieve a uniform temperature distribution profile along the overall length of electrically conductive workpieces with different characteristics in a single induction coil or combination of induction coils.

Another object of the present invention is improving the versatility of an induction heating system comprising a single induction coil and power supply by selectively controlling the induced temperature profile of electrically conductive workpieces with different characteristics in the single induction coil.

BRIEF SUMMARY OF THE INVENTION

In one aspect the present invention is an apparatus for, and method of electric induction heating of an electrically conductive workpiece in at least one solenoidal coil receiving power from an ac power source while at least one flux compensator is brought near to at least one end of the workpiece in the coil to affect the induced heating temperature profile for the workpiece. The flux compensator is selected based upon the characteristics of the workpiece to be inductively heated and the required induced heating temperature profile.

In another aspect the present invention is an apparatus for, and method of, controlling an induced longitudinally oriented, cross sectional heating profile in an electrically conductive workpiece without flux concentrators. The workpiece is positioned in a solenoidal type induction coil so that a coil overhang region exists adjacent to an end of the workpiece. A flux compensator is positioned in the coil overhang region with one end of the flux compensator proximate to the end of the workpiece to alter the induced longitudinally oriented, cross sectional heating profile in the end of the workpiece. In other examples of the invention an electromagnetic gap is provided between the opposing ends of the flux compensator and the workpiece. An alternating current is supplied to the induction coil to create the induced longitudinally oriented, cross sectional heating profile in the electrically conductive workpiece.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims:

FIG. 5(a) illustrates in cross sectional diagram an electrically conductive workpiece inserted into an induction coil so that the coil overhang distances are the same at both end of the coil, and FIG. 5(b) graphically illustrates a uniform temperature profile that can be achieved along the length of the workpiece with the coil and workpiece arrangement shown in FIG. 5(a).

DETAILED DESCRIPTION OF THE INVENTION

Figure 1A:
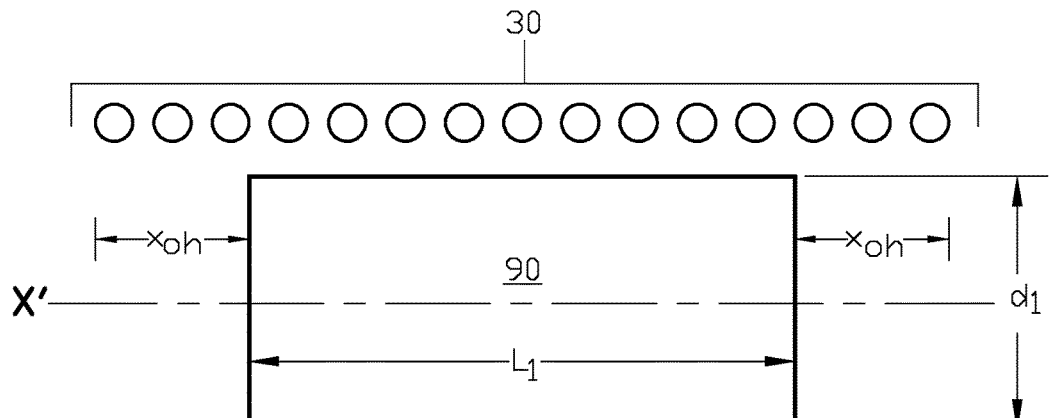
FIG. 1(a) illustrates in a cross sectional diagram, a solenoidal coil with an electrically conductive workpiece positioned in the coil so that the coil overhang distance is the same at both ends of the coil.
Figure 1B:
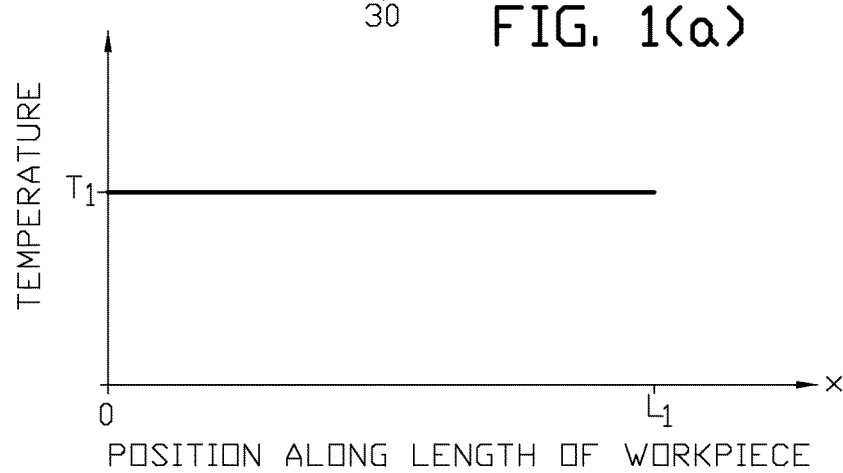
FIG. 1(b) graphically illustrates the uniform temperature profile that can be achieved along the length of the workpiece with the coil and workpiece arrangement shown in FIG. 1(a) in idealized cross sectional isothermal region $R_{iso}$ shown in FIG. 1(c).
Figure 1C:
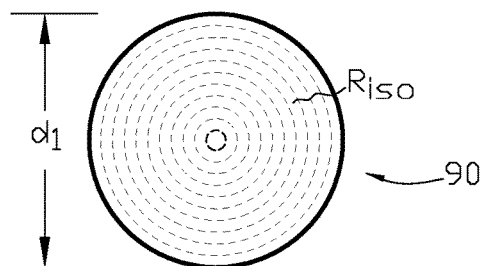
Figure 2A:
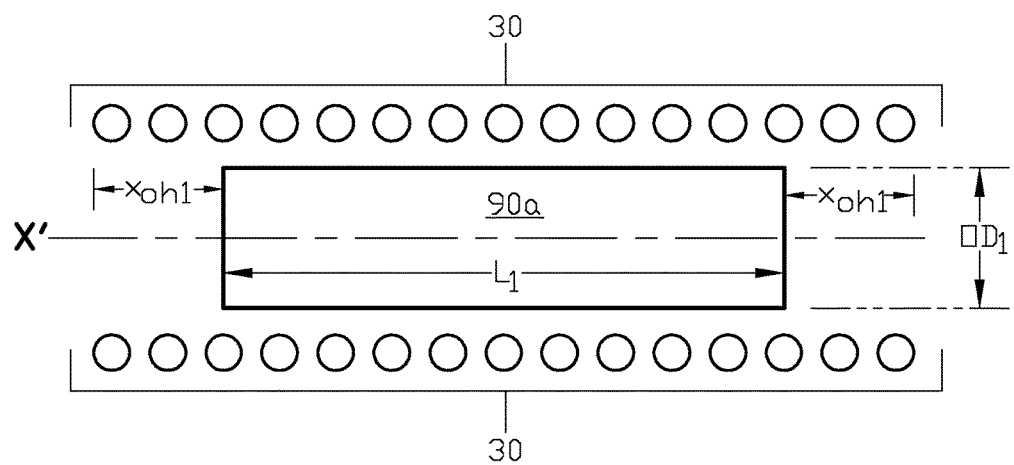
FIG. 2(a)', FIG. 2(b)' and FIG. 2(c)' illustrate the change in temperature distribution profiles along the overall length of workpieces with different characteristics when inductively heated in the same induction coil as illustrated in the arrangements shown in FIG. 2(a), FIG. 2(b) and FIG. 2(c), respectively.
Figure 2A:
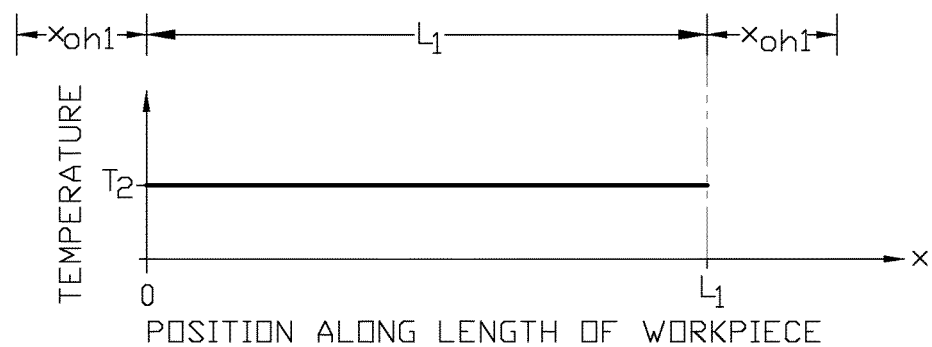
Figure 2B:
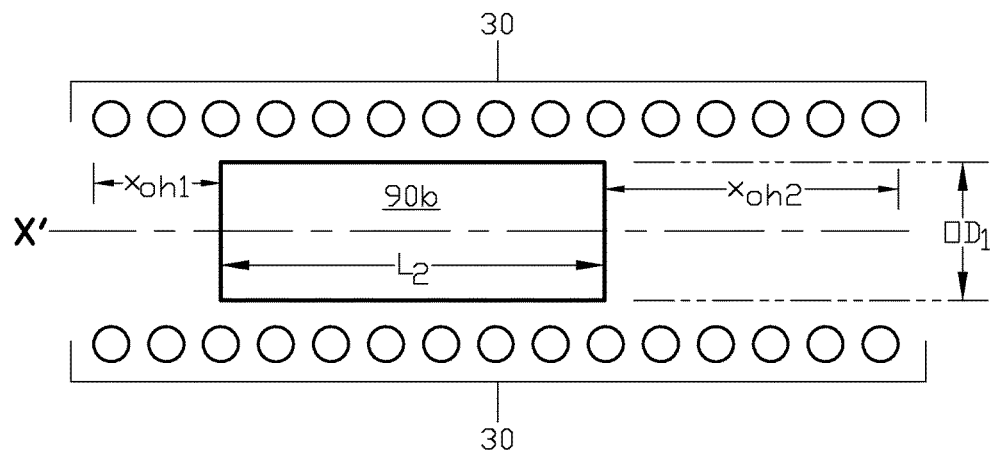
Figure 2B:
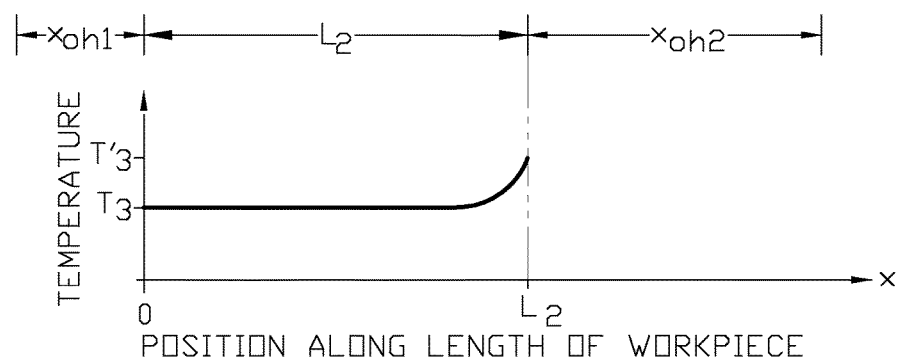
Figure 2C:
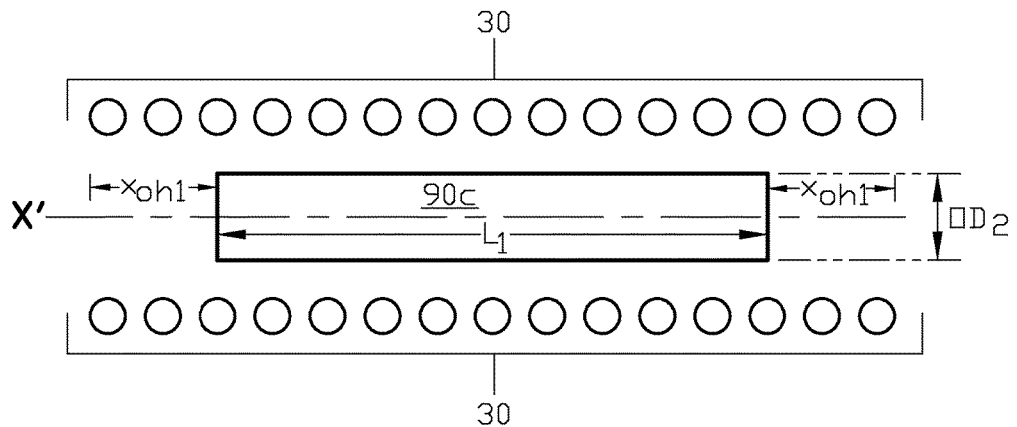
Figure 2C:
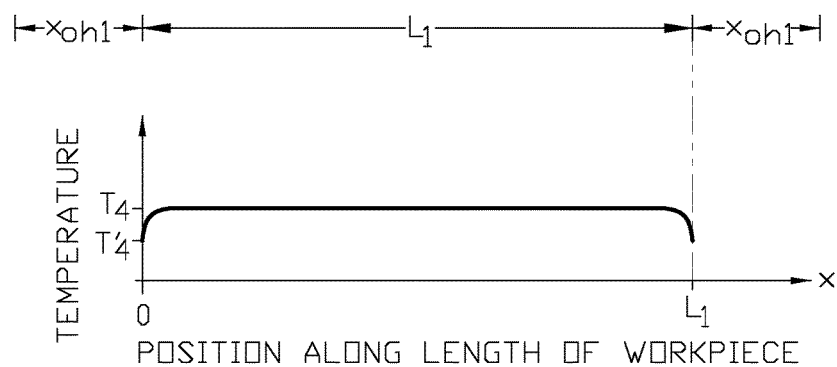
Figure 3A:
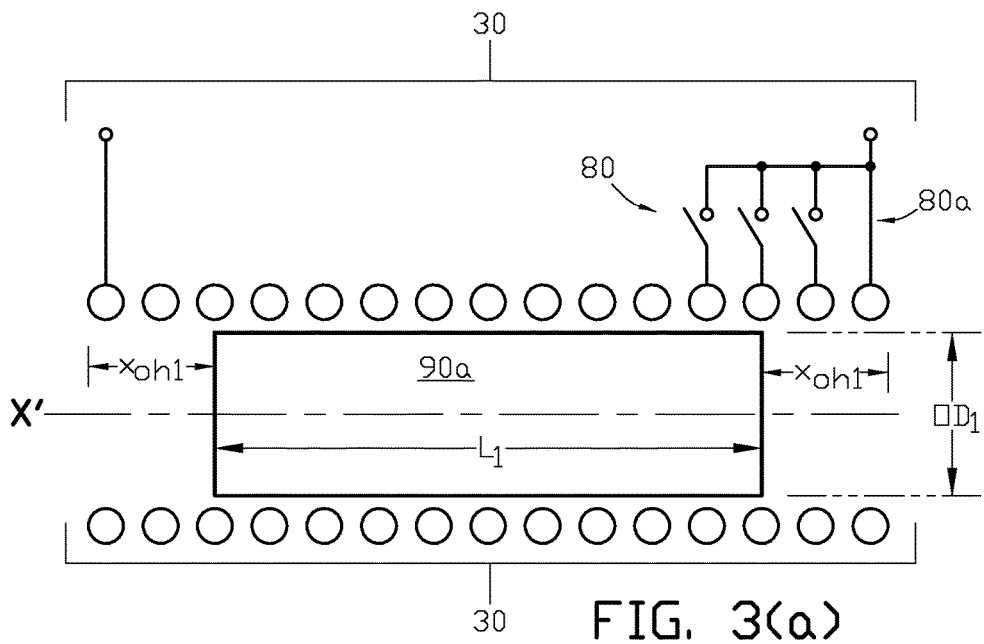
FIG. 3(a) and FIG. 3(b) illustrate in cross sectional diagrams a multiple tap coil that can be used to compensate for induction heating of various workpieces with different characteristics to minimize the effects of irregular end heating of the various workpieces.
Figure 3B:
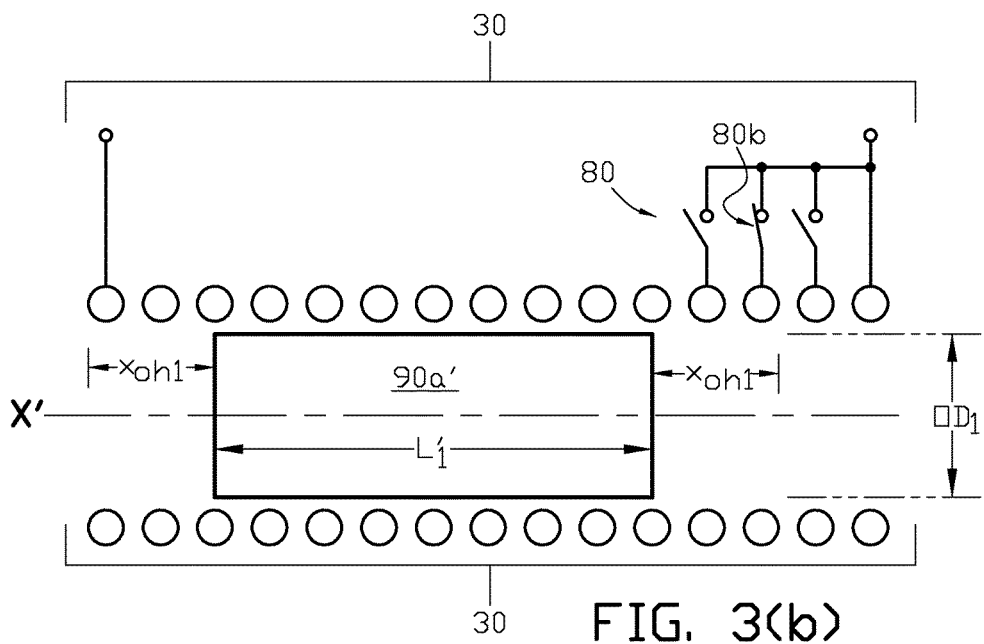
Figure 4A:
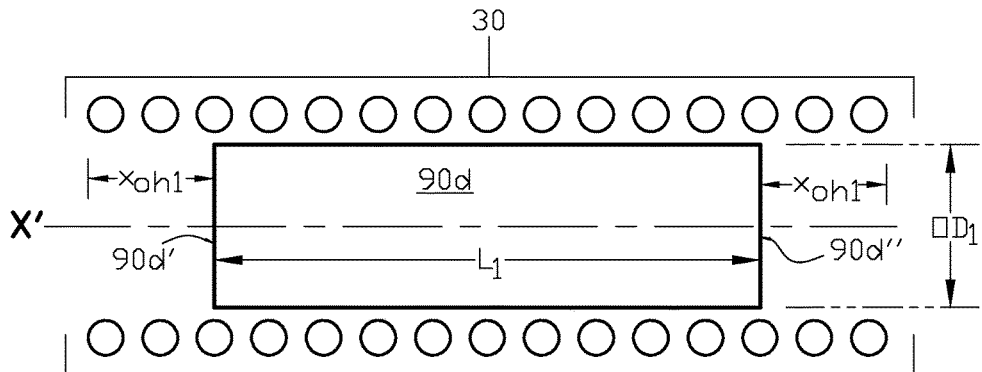
FIG. 4(a), FIG. 4(b) and FIG. 4(c) illustrate in cross sectional diagrams one example of the electric induction heating apparatus of the present invention.
Figure 4B:
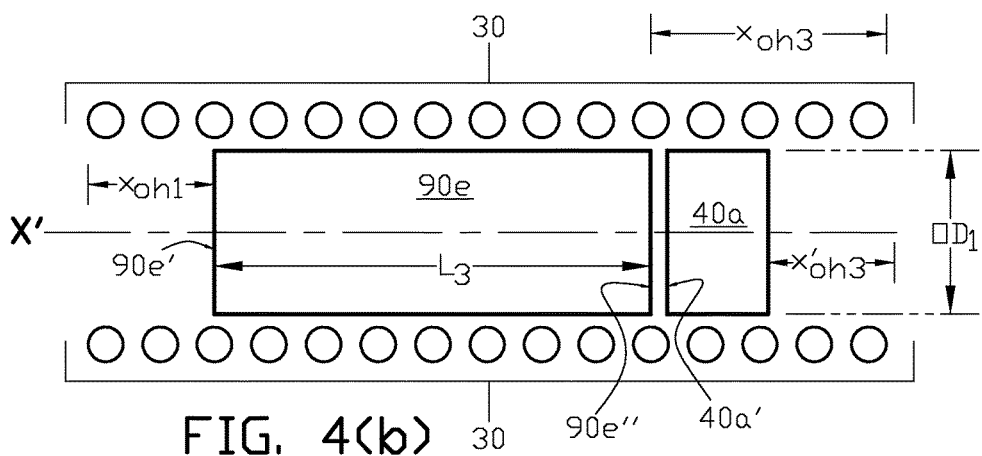
Figure 4C:
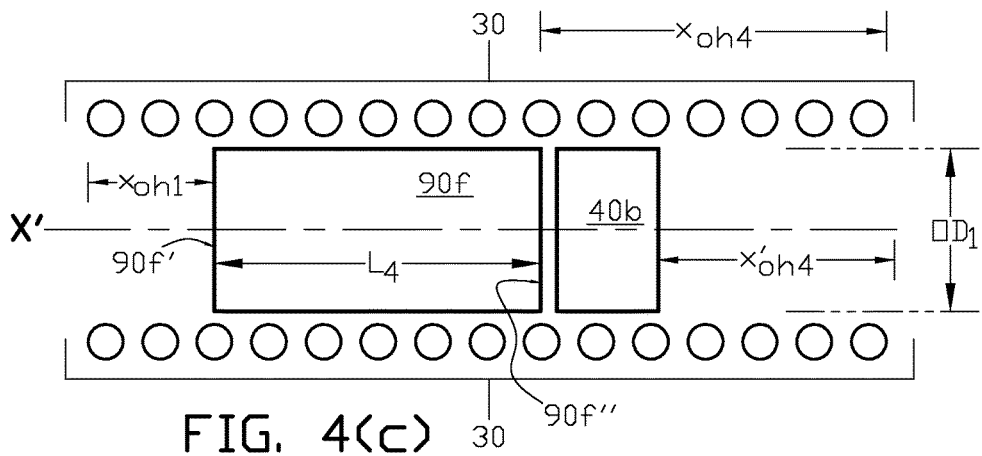

One non-limiting example of the electric induction heating apparatus of the present invention for heating of an electrically conductive workpiece is diagrammatically illustrated in FIG. 4(a), FIG. 4(b) and FIG. 4(c). The apparatus comprises a single multi-turn solenoidal induction coil 30 having an ac power supply (not shown in the figures) connected to the opposing ends of the coil to supply ac current to the coil, which generates a flux field around the coil that couples with the workpiece in the coil to inductively heat the coil. A flux compensator is selectively used during induction heating of workpieces with varying characteristics as further described below. The flux compensator may be a substantially solid or hollow disc. The compensator may be water cooled by providing suitable passages in the compensator and connecting the passages to a supply and return of a cooling medium such as water. Suitable workpiece conveying apparatus can be provided to insert a workpiece into the coil and remove it from inside the coil after heating. Suitable compensator conveying apparatus can be provided to insert the compensator into the coil and remove it from inside the coil after heating. Alternatively a combination of workpiece and compensator conveying apparatus may be provided.

Figure 6A:
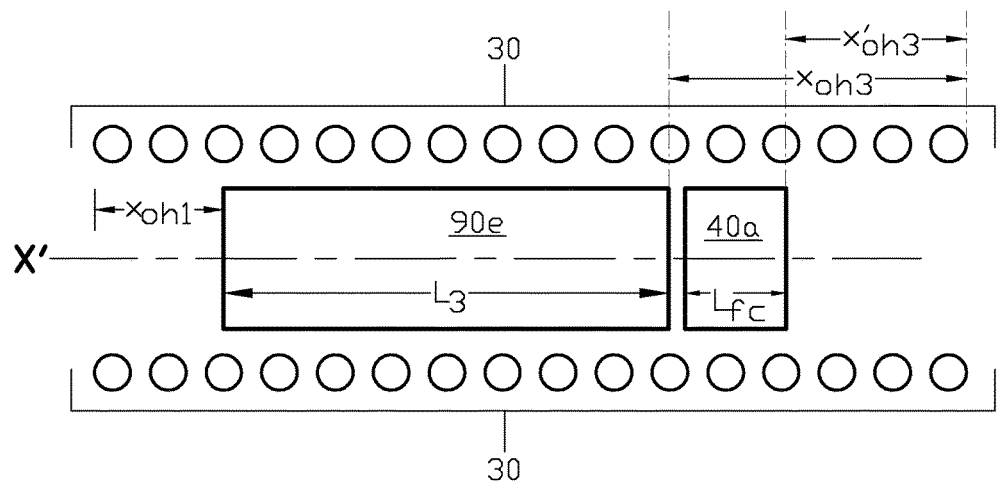
FIG. 6(a) illustrates in cross section diagram another example of the electric induction heating apparatus of the present invention with FIG. 6(b) graphically illustrating a uniform temperature profile that can be achieved along the length of the workpiece with the coil, workpiece and flux compensator arrangement shown in FIG. 6(a).
Figure 6B:
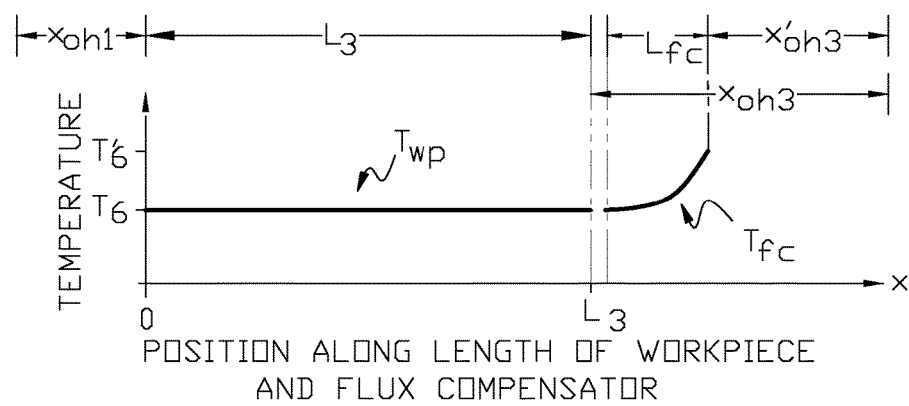

Workpiece 90d in FIG. 4(a) has an overall length of $L_1$; workpiece 90e in FIG. 4(b) has an overall length of $L_3$, which is less than length $L_1$; and workpiece 90f in FIG. 4(c) has an overall length of $L_4$, which is less than length $L_3$. Workpiece 90d in FIG. 4(a) is of optimal length for induction heating with uniform temperature distribution along its overall length when the coil overhang distance $X_{oh1}$ is the same at both ends of the coil as shown in FIG. 4(a). In FIG. 4(b) end surface 40a' of compensator 40a is brought in close proximity to end surface 90e'' (designated "second end") of workpiece 90e to compensate for the shorter overall length of the workpiece so that overheating of the second end of the workpiece is mitigated. If for example, workpiece 90e is a non-magnetic stainless steel billet, a distance of approximately 0.03-inch to approximately 1.8-inch between the opposing end surfaces of the workpiece and compensator may be considered a sufficiently small gap and therefore in close proximity. If the flux compensator is formed from a material composition that has approximately the same, for example, approximately no greater than 10 to 15 percent variation in electromagnetic properties (primarily electrical resistivity and magnetic permeability) as the workpiece, and the difference in diameters of compensator 40a and workpiece 90e are approximately no greater than the one fourth of the depth of eddy current penetration into the workpiece, and the electromagnetic gap between compensator 40a and workpiece 90e is sufficiently small while utilizing medium frequency (that is, from about 1 kHz to about 10 kHz) of the power source, then there will be no appreciable disturbance of the electromagnetic field at the second end of workpiece 90e as shown in FIG. 4(b) and FIG. 6(a) assuming a sufficiently long flux compensator. Induced heating temperature distribution (line $T_{wp}$ in FIG. 6(b)) along the overall length of workpiece 90e in FIG. 6(a) will be uniform, as it would be in the case of optimal coil overhang $x_{oh1}$ as shown in FIG. 4(a) and FIG. 5(a) regardless of the fact that the actual coil overhang distance from the second end of the workpiece was increased from $x_{oh1}$ (in FIG. 4(a) and FIG. 5(a)) to $x_{oh3}$ (in FIG. 4(b) and FIG. 6(a)). Magnetic field disturbance at the coil's second end region is compensated for by use of flux compensator 40a, and is localized within the compensator, which results in shifting temperature surplus $T_{fc}$ from the second end of the workpiece to compensator 40a as graphically illustrated in FIG. 6(b).

Figure 7A:
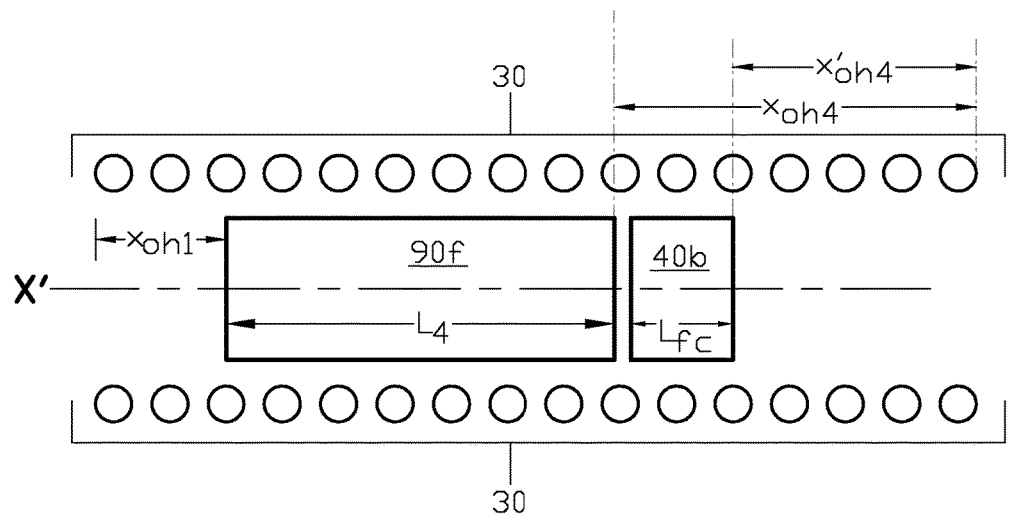
FIG. 7(a) illustrates in cross section diagram another example of the electric induction heating apparatus of the present invention with FIG. 7(b) graphically illustrating a uniform temperature profile that can be achieved along the length of the workpiece with the coil, workpiece and flux compensator arrangement shown in FIG. 7(a).
Figure 7B:
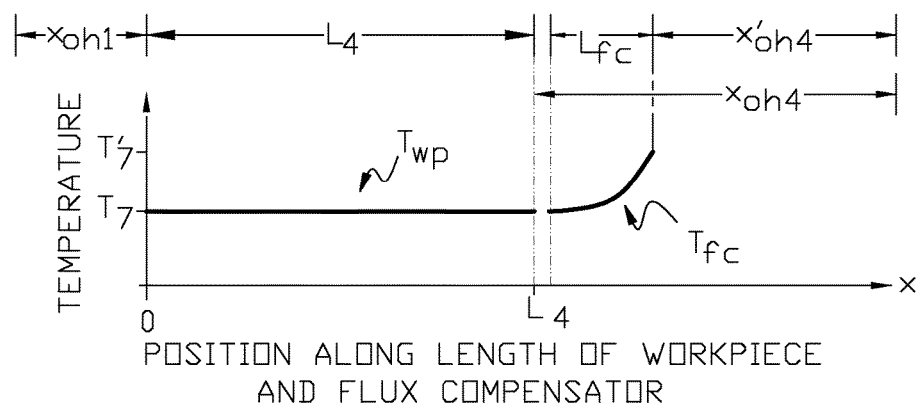

FIG. 4(c) and FIG. 7(a) illustrate an arrangement of the present invention wherein the overall length $L_4$ of workpiece 90f is less than the overall length of workpiece 90e shown in FIG. 4(b) and FIG. 6(a), which results in a further increase of the coil overhang distance to $x_{oh4}$ at the second end of workpiece 90f, which is compensated for by use of flux compensator 40b to achieve the uniform induced heating temperature distribution profile (line $T_{wp}$) shown in FIG. 7(b). The overall length of the utilized flux compensator depends upon the induced heating temperature distribution profile desired for the overall length of the workpiece. For example, if a uniform temperature distribution is required, the utilized flux compensator should be of sufficient length to ensure that the end effect zone (where magnetic field disturbances take place) will be localized within the length of the adjacent flux compensator as shown represented by the non-uniform temperature distribution profile (curve $T_{fc}$) for compensator 40b in FIG. 7(b). If a non-uniform temperature distribution is required, for example a temperature gradient along the length of the second end of the workpiece, that end of the workpiece should be inductively heated to a temperature that is greater than the remainder of the overall length of the workpiece. For this arrangement, the length of flux compensator will be shorter than that required for a uniform temperature distribution to assure that the end effect zone will not be localized within the flux compensator, but will occur in the end of the workpiece requiring the higher temperature.

The flux compensator used in the induction heating apparatus and method of the present invention is not a flux concentrator, which is also known as a flux diverter, flux controller, magnetic shunt or magnetic core, and should not be made from materials typically used to fabricate flux concentrators. Physical properties of flux concentrators are significantly different from the properties of workpieces that the concentrators are used with in induction heating applications. Regardless of physical properties of the workpiece, the materials used as magnetic flux concentrators are soft magnetic in nature, which means that they become magnetic as soon as external magnetic field is applied. The types of materials most commonly used in induction heating for flux concentrators are laminations, electrolytic iron-based powder-type materials, carbonyl iron-based powder-type materials, pure ferrites and ferrite-based materials. Magnetic flux concentrators are fabricated in such a way that they would have very high electrical resistivity (ideally infinite electrical resistivity) and negligible eddy current losses. In contrast, as described above, flux compensators are formed from materials that have similar electromagnetic properties to the workpiece that is being inductively heated. Therefore if the non-magnetic workpiece is formed from a relatively high electrically resistive material, for example, an austenitic stainless steel or titanium alloy composition, then the flux compensator should also be formed from a relatively high electrically resistive non-magnetic material. If the workpiece is formed from a material having a relatively low value of electrical resistivity, for example a gold, aluminum, silver, or copper alloy composition, then the flux compensator should also be formed from a low electrical resistivity material.

The flux compensator used in the induction heating apparatus and method of the present invention is not a Faraday's induction ring, which is also known as a conductive shield, copper ring, copper cap or "robber" ring. Faraday's rings are passive shields basically representing single-turn shorted inductors that cancel, or dramatically reduce, the magnetic field of the source induction coil to improve shielding performances. The source induction coil induces eddy current within a Faraday's ring, which eddy current generates its own magnetic field that opposes and cancels the source field. Effectiveness of Faraday's rings and their shielding characteristics are noticeably decreased if high electrical resistivity materials are used for their fabrication. This is the reason why Faraday's rings are typically made from materials with low electrical resistivity such as, for example, a copper, aluminum or silver composition.

Figure 8A:
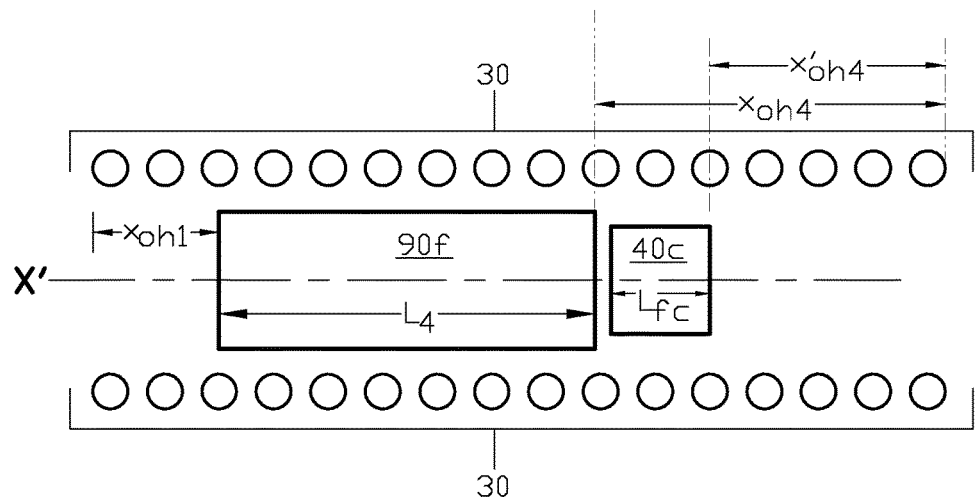
FIG. 8(a) illustrates in cross section diagram another example of the electric induction heating apparatus of the present invention with FIG. 8(b) graphically illustrating a non-uniform temperature profile that can be achieved along the length of the workpiece with the coil, workpiece and flux compensator arrangement shown in FIG. 8(a).
Figure 8B:
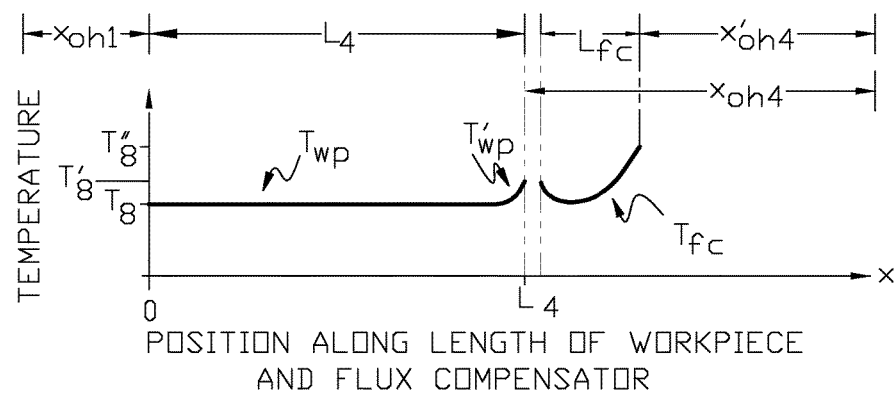
Figure 9A:
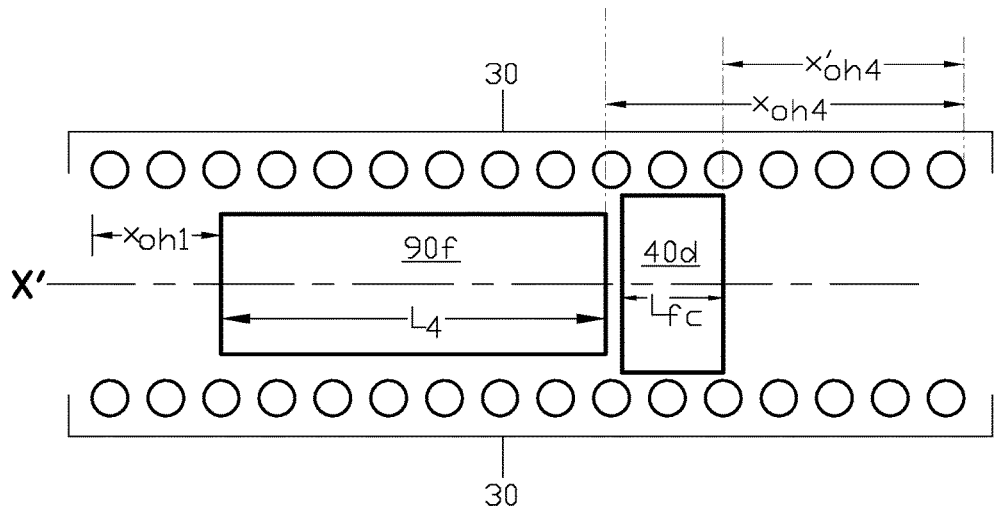
FIG. 9(a) illustrates in cross section diagram another example of the electric induction heating apparatus of the present invention with FIG. 9(b) graphically illustrating a non-uniform temperature profile that can be achieved along the length of the workpiece with the coil, workpiece and flux compensator arrangement shown in FIG. 9(a).
Figure 9B:
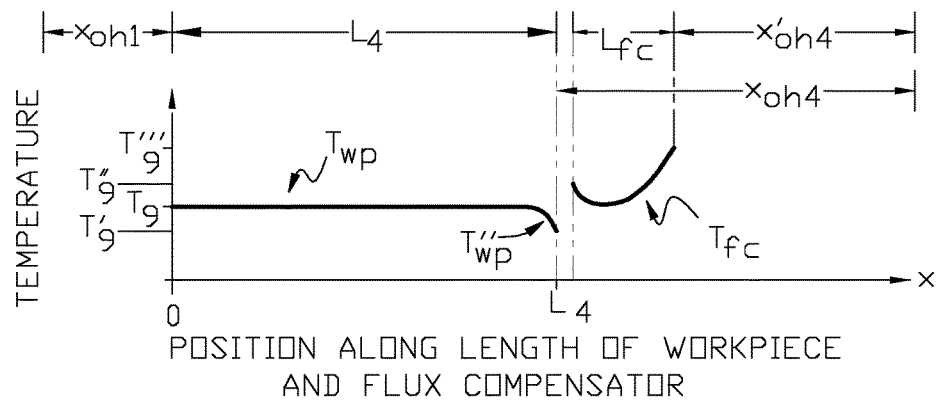

In some applications of the induction heating apparatus and method of the present invention, it is desirable to achieve an induced heat gradient temperature profile along the overall length of the workpiece. One method of achieving this type of gradient temperature profile is by utilizing flux compensators that have diameters different from that of the workpiece. FIG. 8(a) and FIG. 9(a) diagrammatically illustrate non-limiting exemplary arrangements of the present invention where the diameter of compensator 40c is less than the diameter of workpiece 90f, and where the diameter of compensator 40d is greater than the diameter of workpiece 90f, respectively. FIG. 8(b) and FIG. 9(b) graphically illustrate the corresponding non-uniform temperature distributions that result within workpiece 90f. If the diameter of the flux compensator is less than the diameter of the workpiece being inductively heated as shown in FIG. 8(a), then the end of the workpiece will have a surplus of heat sources and the second end workpiece temperature (curve $T'_{wp}$) will be higher than temperature (line $T_{wp}$) throughout the other regions of the workpiece as graphically illustrated in FIG. 8(b). If the diameter of flux compensator is greater than the diameter of the workpiece being inductively heated as shown in FIG. 9(a), then the end of the workpiece will have a deficit of heat sources and the second end workpiece temperature (curve $T''_{wp}$) will be lower than temperature (line $T_{wp}$) throughout the other regions of the workpiece as graphically illustrated in FIG. 9(b).

While it is preferred in the above examples of the invention to bring the opposing ends of the flux compensator and workpiece in close proximity to each other, it is possible in other examples of the invention to have the opposing ends of the flux compensator and workpiece in contact with each other. If this is done, then the induced power (heat sources) at the workpiece end area while being in contact with flux compensator can cause heat flow from the workpiece end area towards the flux compensator resulting in either a uniform or non-uniform cross sectional temperature distribution profile in the workpiece.

Figure 10A:
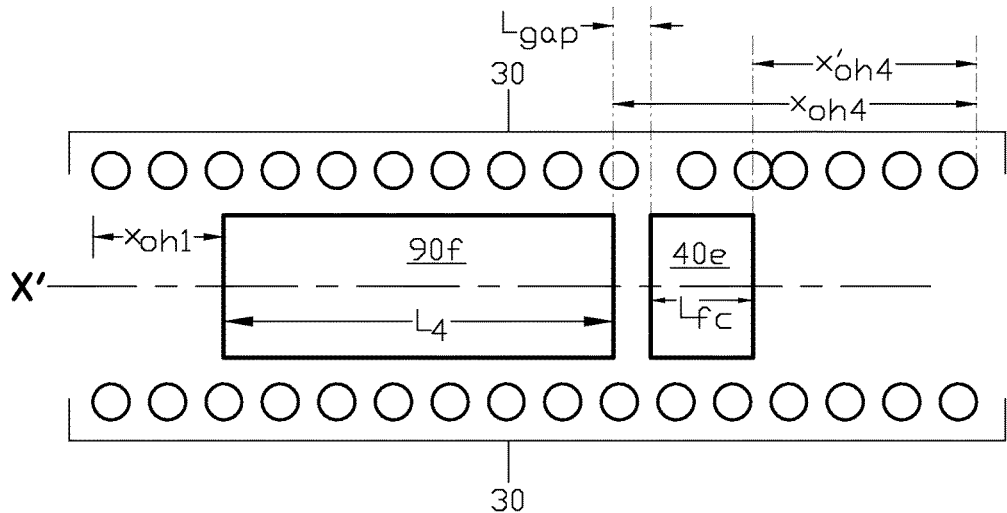
FIG. 10(a) illustrates in cross sectional diagram another example of the electric induction heating apparatus of an electrically conductive workpiece of the present invention with FIG. 10(b) graphically illustrating a non-uniform temperature profile that can be achieved along the length of the workpiece with the coil, workpiece and flux compensator arrangement shown in FIG. 10(a).
Figure 10B:
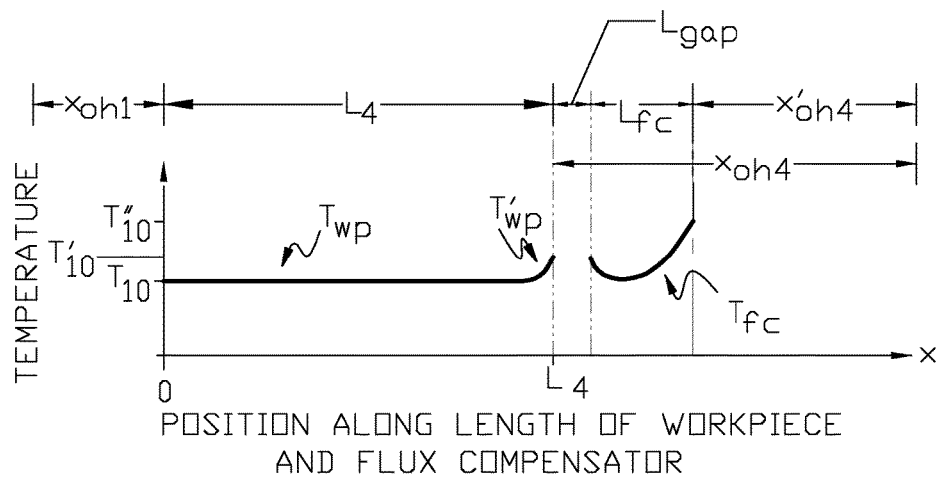

Another method of achieving a gradient temperature profile is by establishing an electromagnetic gap between the facing ends of the compensator and the workpiece that is to be inductively heat treated. FIG. 10(a) diagrammatically illustrates one non-limiting exemplary arrangement of the present invention where the longitudinal temperature distribution (curve $T'_{wp}$) near the second end of workpiece 90f is non-uniform due to an electromagnetic gap $L_{gap}$ between compensator 40e and workpiece 90f. An electromagnetic gap is defined herein as a region occupied by a substantially non-electrically conductive and non-magnetic material. For example the flux compensator may have a thermal insulation plate (refractory) positioned in electromagnetic gap $L_{gap}$. The thermal insulation plate may be physically attached to the facing end of compensator 40e and make physical contact with the second end of the workpiece. If the thermal insulation plate is made from a non-electrically conductive and non-magnetic material, the plate will be effectively transparent to an electromagnetic field, and electromagnetically, behave as free space (acting as air or vacuum). Therefore even though there is no actual free space air gap between facing ends of the flux compensator and the workpiece, there is an electromagnetic gap resulting from the presence of the thermal insulating plate. Non-electrically conductive spacers, or spacers fabricated from electrically conductive materials that incorporate eddy current reduction features, such as radial and/or longitudinal slots, can also be used to establish an electromagnetic gap.

In general the induction heating apparatus and method of the present invention utilizes one or more flux compensators with positioning, dimensions, composition and optional electromagnetic gap as disclosed herein to alter the induced heating temperature distribution profile of workpieces with different characteristics that are inserted into the same solenoidal coil for induction heating. A flux compensator may comprise two or more flux compensators joined together at facing ends. A flux compensator assembly can be provided wherein the assembly comprises a flux compensator (head element) mounted in a compensator holder that can be fastened to a compensator transfer apparatus to move the head element in and out of the coil. A series of interchangeable compensator head elements can be used in the assembly to accommodate induction heating of various workpieces with different characteristics in the same induction coil, and can be extended to using oval coils, channel inductors, and similar coils/inductors that can generically be described as solenoidal type coils.

The term "solenoidal induction coil" as used in the invention is understood in its broadest sense as any combination of one or more induction coils in which a magnetic field is generated when an ac current flows through the one or more induction coils, and the magnetic field couples with the electromagnetically conductive material inserted into the one or more induction coil. The invention is not limited to a particular geometric configuration of a solenoidal induction coil.

While the exemplar workpiece in the above examples of the invention are generally cylindrical in shape, the induction heating apparatus of the present invention can be used with electrically conductive workpieces of other shapes, for example either substantially solid or hollow cylindrically shaped workpieces, such as billets, bars, tubes and pipes; either solid or hollow rectangular and trapezoidal shaped workpieces, such as metal slabs, plates and blooms; or any other shape that can be inserted into an induction coil for induced heating as described above. Configuration and positioning of the utilized flux compensators can be altered to suit the particular shape of the workpiece being inductively heated. While diameter and (axial) length are parameters of interest for a cylindrical workpiece in use of the present invention, other parameters may be used for differently shaped workpieces.

While the exemplar flux compensators in the above examples of the invention are generally in the shape of a disc, differently shaped compensators may be used to accommodate workpieces of various shapes in accordance with the apparatus and method of the present invention.

Since the flux compensators used in the present invention can be cooled by a fluid medium and/or thermally insulated from the inductively heated workpiece, they may be used repetitively in the present invention while inductively heating successive workpieces without appreciable thermal fatigue.

In all examples of the invention two separate flux compensators, each one of which has an end facing each of the opposing ends of the workpiece in the induction coil may be used with the apparatus and method of the present induction.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects. The invention is not limited to what is described above but also includes the invention as recited in the attached claims.

The invention claimed is:

1. A method of controlling an induced longitudinally oriented, cross sectional heating profile in an electrically conductive elongated workpiece without flux concentrators, the method comprising the steps of:

positioning the electrically conductive elongated workpiece in a solenoidal type induction coil so that a coil overhang region exists adjacent to at least one end of the electrically conductive elongated workpiece;

positioning at least one flux compensator in the coil overhang region with one end of the at least one flux compensator proximate to the at least one end of the electrically conductive elongated workpiece to alter the induced longitudinally oriented, cross sectional heating profile in the at least one end of the electrically conductive elongated workpiece; and supplying an alternating current to the solenoidal type induction coil to localize in the electrically conductive elongated workpiece or the at least one flux compensator an electromagnetic end effect zone and create the induced longitudinally oriented, cross sectional heating profile in the electrically conductive elongated workpiece.

2. The method of claim 1 further comprising the step of forming the at least one flux compensator with longitudinal and cross sectional dimensions so that the inducted longitudinally oriented, cross sectional heating profile in the at least one end of the electrically conductive elongated workpiece is substantially uniform.

3. The method of claim 1 further comprising the step of forming the at least one flux compensator with a cross sectional area greater than the cross sectional area of the electrically conductive elongated workpiece at the at least one end of the electrically conductive elongated workpiece so that the induced longitudinally oriented, cross sectional heating profile in the at least one end of the electrically conductive elongated workpiece is less than the induced longitudinally oriented, cross sectional heating profile in other regions of the electrically conductive elongated workpiece.

4. The method of claim 1 further comprising the step of forming the at least one flux compensator with cross sectional area less than the cross sectional area of the electrically conductive elongated workpiece at the at least one end of the electrically conductive elongated workpiece so that the induced longitudinally oriented, cross sectional heating profile in the at least one end of the electrically conductive elongated workpiece is greater than the induced longitudinally oriented, cross sectional heating profile in other regions of the electrically conductive elongated workpiece.

5. The method of claim 1 wherein the step of positioning the at least one flux compensator in the coil overhang region with one end of the at least one flux compensator brings the one end of the at least one flux compensator in contact with the at least one end of the electrically conductive elongated workpiece.

6. The method of claim 1 where the step of positioning at least one flux compensator in the coil overhang region with one end of the at least one flux compensator proximate to the at least one end of the electrically conductive elongated workpiece comprises forming an electromagnetic gap between the one end of the at least one flux compensator and the at least one end of the electrically conductive elongated workpiece.

7. The method of claim 6 further comprising the step of forming the electromagnetic gap from a substantially non-electrically conductive and non-magnetic material.

8. The method of claim 1 wherein the step of positioning at least one flux compensator in the coil overhang region with one end of the at least one flux compensator proximate to the at least one end of the electrically conductive elongated workpiece further comprises positioning the one end of the at least one flux compensator within 0.03-inch to 1.8-inch from the at least one end of the electrically conductive elongated workpiece.

9. The method of claim 1 further comprising the step of forming the at least one flux compensator from the same material as the electrically conductive elongated workpiece.

10. The method of claim 1 further comprising the step of forming the at least one flux compensator from a material having an electrical resistivity no greater than plus or minus 15 percent of the electrical resistivity of the electrically conductive elongated workpiece and a magnetic permeability no greater than plus or minus 15 percent of the magnetic permeability of the electrically conductive elongated workpiece.

11. The method of claim 1 further comprising the step of forming the at least one flux compensator from a material having an electrical resistivity no greater than plus or minus 15 percent of the electrical resistivity of the electrically conductive elongated workpiece and a magnetic permeability no greater than plus or minus 15 percent of the magnetic permeability of the electrically conductive elongated workpiece with the difference between the one end of the at least one flux compensator diameter and the at least one end of the workpiece diameter being no greater than one fourth of the depth of eddy current penetration into the electrically conductive elongated workpiece when supplying the alternating current to the solenoidal type induction coil to create the induced longitudinally oriented, cross sectional heating profile in the electrically conductive material.

12. The method of claim 1 further comprising the step of forming the at least one flux compensator in the shape of a hollow disc.

* * * * *